United States Patent
Yasuda

(10) Patent No.: US 10,510,488 B2
(45) Date of Patent: Dec. 17, 2019

(54) MULTILAYER CERAMIC CAPACITOR

(71) Applicant: Murata Manufacturing Co., Ltd., Nagaokakyo-shi, Kyoto-fu (JP)

(72) Inventor: Atsushi Yasuda, Nagaokakyo (JP)

(73) Assignee: MURATA MANUFACTURING CO., LTD., Kyoto (JP)

( * ) Notice: Subject to any disclaimer, the term of this patent is extended or adjusted under 35 U.S.C. 154(b) by 42 days.

(21) Appl. No.: 15/688,955

(22) Filed: Aug. 29, 2017

(65) Prior Publication Data

US 2018/0061577 A1 Mar. 1, 2018

(30) Foreign Application Priority Data

Aug. 30, 2016 (JP) .................................. 2016-167458

(51) Int. Cl.
| | |
|---|---|
| H01G 4/06 | (2006.01) |
| H01G 4/08 | (2006.01) |
| H01G 4/12 | (2006.01) |
| H01G 4/30 | (2006.01) |
| H01G 4/232 | (2006.01) |
| C25D 5/02 | (2006.01) |
| H01C 1/14 | (2006.01) |
| H01C 1/148 | (2006.01) |
| H01G 4/005 | (2006.01) |
| H01G 4/228 | (2006.01) |

(52) U.S. Cl.
CPC .............. H01G 4/30 (2013.01); H01G 4/005 (2013.01); H01G 4/12 (2013.01); H01G 4/228 (2013.01)

(58) Field of Classification Search
CPC .. H01G 4/06; H01G 4/08; H01G 4/12; H01G 4/30; H01G 4/232; C25D 5/02; H01C 1/14; H01C 1/148

USPC ... 361/301.4, 311, 313, 321.2, 321.3, 321.5; 205/122

See application file for complete search history.

(56) References Cited

U.S. PATENT DOCUMENTS

| | | | | |
|---|---|---|---|---|
| 5,036,424 A * | 7/1991 | Yokotani | ................. | B32B 18/00 29/25.42 |
| 5,426,560 A * | 6/1995 | Amaya | ................ | H01G 4/2325 29/25.42 |
| 5,623,389 A * | 4/1997 | Sanada | ................ | H01G 4/0085 361/313 |
| 5,805,409 A * | 9/1998 | Takahara | ............. | H01G 4/2325 361/301.4 |
| 5,910,881 A * | 6/1999 | Ueno | ....................... | H01G 4/30 361/313 |
| 2001/0043454 A1* | 11/2001 | Yoshii | .................... | H01C 1/148 361/321.2 |

(Continued)

FOREIGN PATENT DOCUMENTS

JP 2002-353068 A 12/2002

*Primary Examiner* — Xiaoliang Chen
(74) *Attorney, Agent, or Firm* — Keating & Bennett, LLP

(57) ABSTRACT

A multilayer ceramic capacitor includes a laminated body including ceramic layers, first internal electrode layers, and second internal electrode layers alternately laminated. First and second external electrodes provided on the laminated body include first diffusion portions defined by interdiffusion of the first internal electrode layers and the first external electrode at interfaces between the first internal electrode layers and the ceramic layers, and second diffusion portions defined by interdiffusion of the second internal electrode layers and the second external electrode at interfaces between the second internal electrode layers and the ceramic layers.

19 Claims, 3 Drawing Sheets

(56) References Cited

U.S. PATENT DOCUMENTS

| | | | |
|---|---|---|---|
| 2005/0180092 A1* | 8/2005 | Hibi | H01G 4/12 361/311 |
| 2005/0213283 A1* | 9/2005 | Nakano | B32B 18/00 361/321.4 |
| 2006/0138590 A1* | 6/2006 | Suzuki | H01G 4/0085 257/532 |
| 2006/0208575 A1* | 9/2006 | Orimo | H01G 4/0085 307/109 |
| 2006/0254693 A1* | 11/2006 | Murosawa | B32B 18/00 156/89.14 |
| 2007/0278907 A1* | 12/2007 | Kondo | H01L 41/0471 310/364 |
| 2008/0081200 A1* | 4/2008 | Katsube | H01G 4/2325 428/457 |
| 2008/0210564 A1* | 9/2008 | Motoki | H01G 4/012 205/122 |
| 2009/0009927 A1* | 1/2009 | Iguchi | H01G 4/1227 361/321.5 |
| 2009/0279229 A1* | 11/2009 | Motoki | H01G 4/005 361/321.3 |
| 2011/0149471 A1* | 6/2011 | Hur | H01G 4/12 361/321.2 |
| 2012/0196032 A1* | 8/2012 | Katsube | H01G 4/2325 427/123 |
| 2015/0179340 A1* | 6/2015 | Hur | H01G 4/12 361/301.4 |
| 2016/0071647 A1* | 3/2016 | Nishisaka | H01G 4/30 361/301.4 |
| 2016/0181016 A1* | 6/2016 | Koga | H01G 4/30 361/301.4 |
| 2016/0196922 A1* | 7/2016 | Omori | H01G 4/30 361/301.4 |
| 2016/0268046 A1* | 9/2016 | Nishisaka | H01G 4/12 |
| 2017/0018358 A1* | 1/2017 | Isota | H01G 4/30 |
| 2017/0018362 A1* | 1/2017 | Nishisaka | H01G 4/30 |

* cited by examiner

MULTILAYER CERAMIC CAPACITOR

CROSS REFERENCE TO RELATED APPLICATIONS

This application claims the benefit of priority to Japanese Patent Application No. 2016-167458 filed on Aug. 30, 2016. The entire contents of this application are hereby incorporated herein by reference.

BACKGROUND OF THE INVENTION

1. Field of the Invention

The present invention relates to a multilayer ceramic capacitor.

2. Description of the Related Art

The reduction in size and the reduction in thickness have been further progressed for electronic devices as typified by cellular phones and the like. In response to the current situation, the reduction in size and the reduction in thickness have been also progressed for multilayer ceramic capacitors included in the electronic devices. The multilayer ceramic capacitors each include, for example: a laminated body formed in a rectangular parallelepiped shape by alternately laminating ceramic layers for inner layers and internal electrode layers, and further laminating ceramic layers for outer layers on each of principal surfaces opposite to each other in the laminating direction; and external electrodes formed on each of end surfaces opposite to each other in the length direction of the laminated body. Japanese Patent Application Laid-Open No. 2002-353068 discloses a multilayer ceramic capacitor for purposes such as arranging a product shape into a rectangular parallelepiped.

The multilayer ceramic capacitor in Japanese Patent Application Laid-Open No. 2002-353068 is composed of dielectric layers of a sintered body such as a ceramic, first internal electrode layers, second internal electrode layers, and external electrode layers. The laminated body is, in the direction along principal surfaces of the laminate, classified into: portions where the internal electrodes are not adjacent closest to each other in the laminating direction (end surface parts); and a portion where the internal electrodes are adjacent closest to each other therein (a central portion sandwiched between the respective end surface portions). In this regard, the second internal electrode layers refer to internal electrode layers formed by lamination at the end surface portions over the first internal electrode layers. The internal electrode thicknesses at the end surface portions (the thickness of the first internal electrode layer+the thickness of the second internal electrode layer) are larger than the internal electrode thickness (the thickness of the first internal electrode layer) at the central portion.

The multilayer ceramic capacitor in Japanese Patent Application Laid-Open No. 2002-353068 includes the external electrodes on each of end surfaces of the laminated body. These external electrodes are typically formed by applying a conductive paste to the end surfaces of the laminated body, and sintering the paste. The conductive paste diffuses into the internal electrode layers in the process of being sintered. Thus, portions of the internal electrode layers (portions located closer to the end surfaces of the laminated body) are bloated, thus generating deflection stress in the laminated body. As a result, the multilayer ceramic capacitor has the problem of being cracked. In particular, in the multilayer ceramic capacitor in Japanese Patent Application Laid-Open No. 2002-353068, this problem occurs frequently and is significant because the internal electrode layers located closer to the end surfaces are large in a thickness dimension.

SUMMARY OF THE INVENTION

Therefore, preferred embodiments of the present invention provide multilayer ceramic capacitors that significantly reduce or prevent generation of cracks which can be caused by sintering a conductive paste used to form external electrodes.

A multilayer ceramic capacitor according to a preferred embodiment of the present invention includes a laminated body that has a rectangular or substantially rectangular parallelepiped shape and includes a plurality of ceramic layers, a plurality of first internal electrode layers, and a plurality of second internal electrode layers alternately laminated, the laminated body including a first principal surface and a second principal surface opposite to each other in a laminating direction, a first side surface and a second side surface opposite to each other in a width direction perpendicular or substantially perpendicular to the laminating direction, and a first end surface and a second end surface opposite to each other in a length direction perpendicular or substantially perpendicular to the laminating direction and the width direction; and a first external electrode provided on the first end surface of the laminated body, and a second external electrode provided on the second end surface of the laminated body, and the plurality of first internal electrode layers are each electrically connected to the first external electrode by an extended electrode portion that extends to the first end surface of the laminated body, and the plurality of second internal electrode layers are each electrically connected to the second external electrode by an extended electrode portion that extends to the second end surface of the laminated body, and the capacitor includes first diffusion portions defined by interdiffusion of the plurality of first internal electrode layers and the first external electrode at the interfaces between the plurality of first internal electrode layers and the plurality of ceramic layers, and second diffusion portions defined by interdiffusion of the plurality of second internal electrode layers and the second external electrode at the interfaces between the plurality of second internal electrode layers and the plurality of ceramic layers.

Preferably, the first diffusion portions and the second diffusion portions each contain Cu, and the first internal electrode layers and the second internal electrode layers each contain Ni.

Further preferably, Cu in the first diffusion portions diffuses into Ni in the extended electrode portions of the first internal electrode layers, and Cu in the second diffusion portions diffuses into Ni in the extended electrode portions of the second internal electrode layers.

Preferably, the first diffusion portions and the second diffusion portions each have a dimension of about 20 µm or more and about 30 µm or less in the length direction, for example.

According to preferred embodiments of the present invention, multilayer ceramic capacitors significantly reduce or prevent generation of cracks that may be caused during sintering of conductive paste used to form external electrodes.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Figure 1:
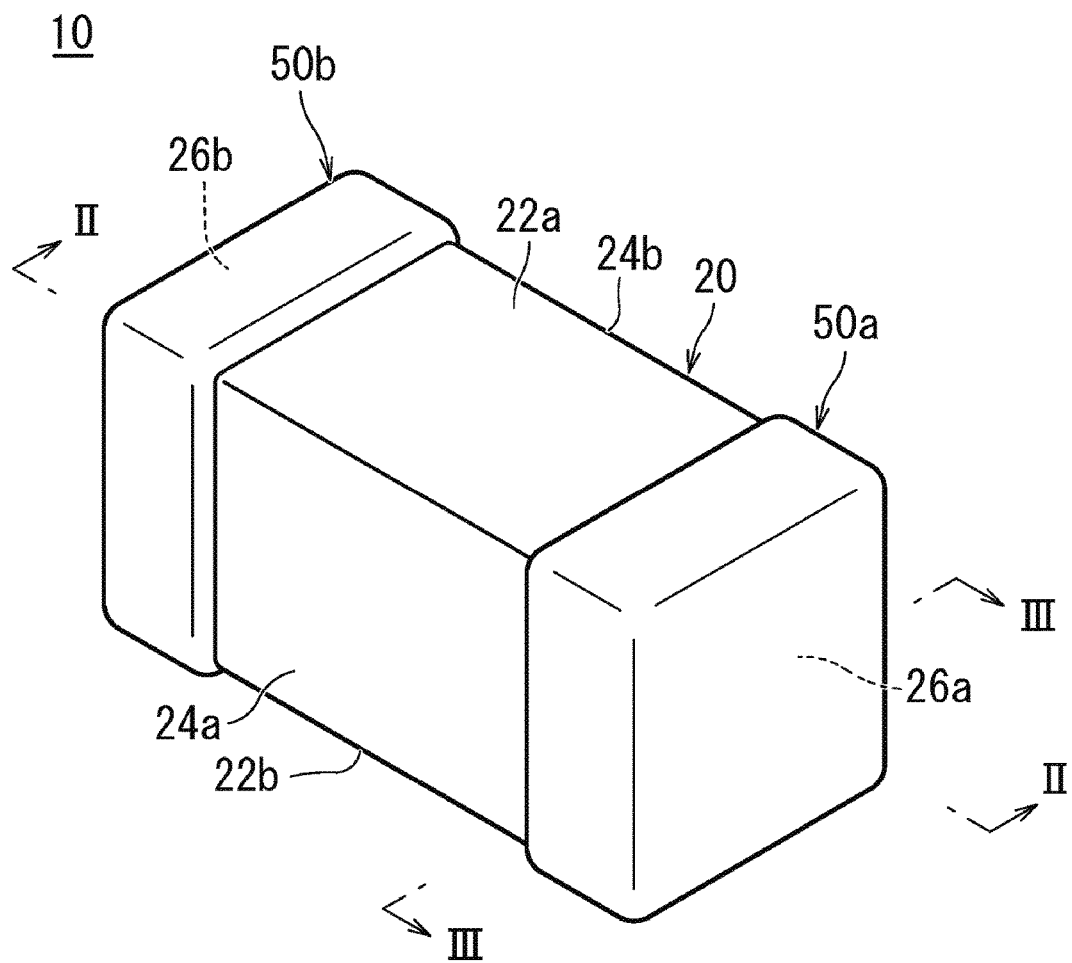
FIG. 1 is an appearance perspective view illustrating a multilayer ceramic capacitor according to a preferred embodiment of the present invention.
Figure 1:
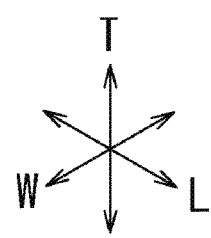
Figure 2:
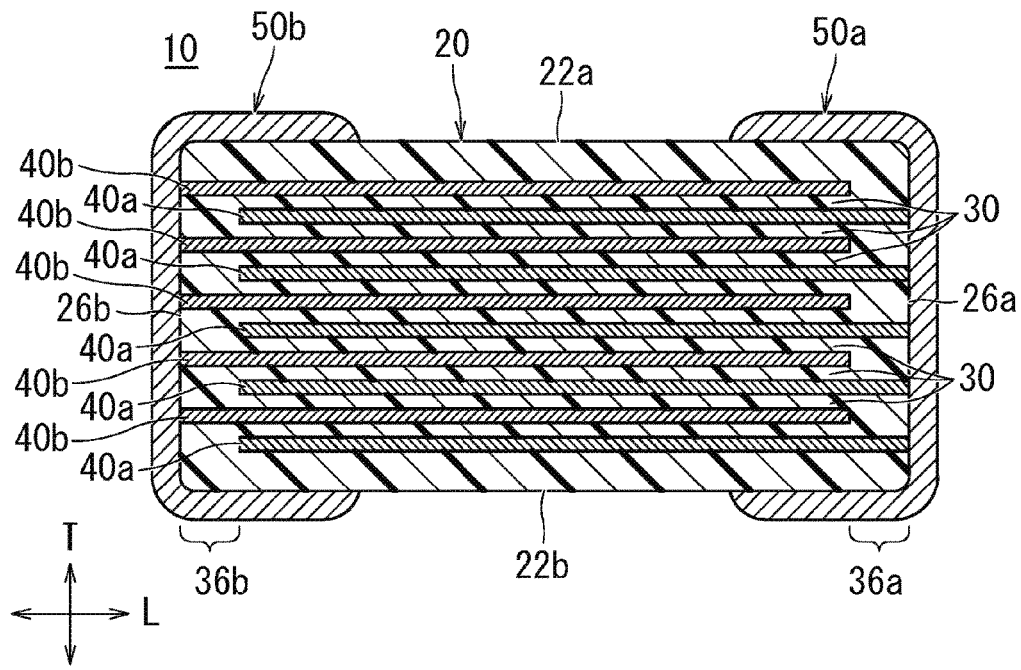
FIG. 2 is a cross-sectional view in a length direction, for illustrating a multilayer ceramic capacitor according to a preferred embodiment of the present invention.
Figure 3:
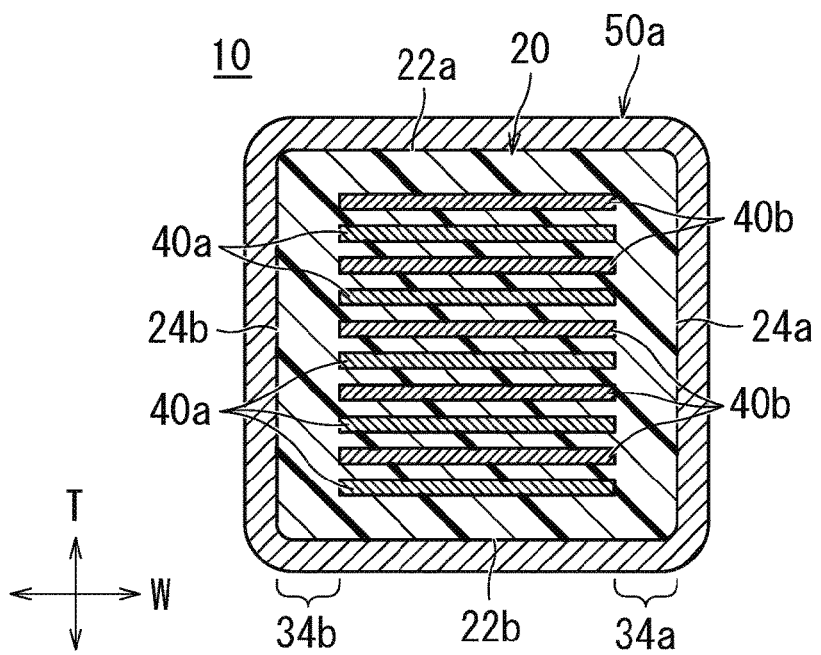
FIG. 3 is a cross-sectional view near a first end surface in a width direction, for illustrating a multilayer ceramic capacitor according to a preferred embodiment of the present invention.

A multilayer ceramic capacitor according to a preferred embodiment of the present invention will be described below with reference to FIGS. 1 to 3. FIG. 1 is an appearance perspective view illustrating a multilayer ceramic capacitor according to a preferred embodiment of the present invention. FIG. 2 is a cross-sectional view in a length direction, illustrating a multilayer ceramic capacitor according to a preferred embodiment of the present invention. FIG. 3 is a cross-sectional view near a first end surface in a width direction, for illustrating a multilayer ceramic capacitor according to a preferred embodiment of the present invention.

The laminated body 20 preferably has a rectangular or substantially rectangular parallelepiped shape and is formed preferably by alternately laminating a plurality of ceramic layers 30, a plurality of first internal electrode layers 40a, and a plurality of second internal electrode layers 40b. More specifically, the laminated body 20 includes a first principal surface 22a and a second principal surface 22b opposite to each other in the laminating direction (T direction shown in FIGS. 1 to 3), a first side surface 24a and a second side surface 24b opposite to each other in the width direction (W direction shown in FIGS. 1 to 3) perpendicular or substantially perpendicular to the laminating direction, and a first end surface 26a and a second end surface 26b opposite to each other in the length direction (L direction shown in FIGS. 1 to 3) perpendicular or substantially perpendicular to the laminating direction and the width direction. The laminated body 20 preferably has corners and ridges rounded. In this regard, the corner of the laminated body 20 refers to the intersection of three surfaces of the surfaces mentioned above. In addition, the ridge of the laminated body 20 refers to the intersection of two surfaces of the surfaces mentioned above. It is to be noted that the laminated body 20 may have a structure such that the dimension thereof in the length direction is shorter than the dimension thereof in the width direction.

The laminated body 20 includes a first side portion 34a (W gap) located between a region where the first internal electrode layers 40a and the second internal electrode layers 40b are opposite with the ceramic layers 30 interposed therebetween (that is, a region where opposed electrode portions to be described are located as portions of the plurality of first internal electrode layers 40a and of the plurality of second internal electrode layers 40b, which is hereinafter referred to simply as a "region with opposed electrode portions located") and the first side surface 24a; and a second side portion 34b (same as above) between the region with opposed electrode portions located and the second side surface 24b. In addition, the laminated body 20 includes: a first end portion 36a (L gap) located between the region with opposed electrode portions located and the first end surface 26a; and a second end portion 36b (same as above) located between the region with opposed electrode portions located and the second end surface 26b.

The ceramic layers 30 are laminated to be sandwiched between the first internal electrode layers 40a and the second internal electrode layers 40b. As a ceramic material for the ceramic layers 30, a dielectric ceramic can be used which contains a main constituent such as, for example, $BaTiO_3$, $CaTiO_3$, $SrTiO_3$, or $CaZrO_3$. In addition, these constituents may have accessory constituents such as an Mn compound, an Fe compound, a Cr compound, a Co compound, and an Ni compound added thereto. It is to be noted that the accessory constituents are lower in content than the main constituent.

The plurality of ceramic layers 30 includes outer layers located respectively closer to the first principal surface 22a and the second principal surface 22b of the laminated body 20; and an inner layer located in a region sandwiched between the outer layer closer to the first principal surface 22a and the outer layer closer to the second principal surface 22b. In this regard, the outer layers of the plurality of ceramic layers 30 refer to the ceramic layer 30 located between the first principal surface 22a of the laminated body 20 and the internal electrode layer (the first internal electrode layer 40a or the second internal electrode layer 40b) closest to the first principal surface 22a; and the ceramic layer 30 located between the second principal surface 22b of the laminated body 20 and the internal electrode layer (same as above) closest to the second principal surface 22b.

The first internal electrode layers 40a extend in the shape of a plate at the interfaces between the ceramic layers 30, and have ends exposed at the first end surface 26a of the laminated body 20. On the other hand, the second internal electrode layers 40b extend in the shape of a plate at the interfaces between the ceramic layers 30 to be opposite to the first internal electrode layers 40a with the ceramic layers 30 interposed therebetween, and have ends exposed at the second end surface 26b of the laminated body 20. Therefore, the first internal electrode layers 40a each include an opposed electrode portion opposite to the second internal electrode layer 40b with the ceramic layer 30 interposed therebetween, and an extended electrode portion from the opposed electrode portion to the first end surface 26a of the laminated body 20.

Likewise, the second internal electrode layers 40b each include an opposed electrode portion opposite to the first internal electrode layer 40a with the ceramic layer 30 interposed therebetween, and an extended electrode portion from the opposed electrode portion to the second end surface 26b of the laminated body 20. The opposed electrode portions of the first internal electrode layers 40a and the opposed electrode portions of the second internal electrode layers 40b are opposite to each other with the ceramic layers 30 interposed therebetween to thus generate electrostatic capacitance.

The first internal electrode layers 40a and the second internal electrode layers 40b contain, for example, a metal such as Ni, Cu, Ag, Pd, an Ag—Pd alloy, and Au. The first internal electrode layers 40a and the second internal electrode layers 40b may further include dielectric grains that have the same composition system as the dielectric ceramic included in the ceramic layers 30.

The first external electrode 50a is provided on the first end surface 26a of the laminated body 20 and thus electrically connected to the first internal electrode layers 40a, and extended therefrom and thus partially reaches each of the first principal surface 22a, the second principal surface 22b, the first side surface 24a, and the second side surface 24b. It is to be noted that the first external electrode 50a may be provided only on the first end surface 26a of the laminated body 20. On the other hand, the second external electrode 50b is provided on the second end surface 26b of the laminated body 20 and thus electrically connected to the second internal electrode layers 40b, and extended therefrom and thus partially reaches each of the first principal surface 22a, the second principal surface 22b, the first side surface 24a, and the second side surface 24b. It is to be noted that the second external electrode 50b may be provided only on the second end surface 26b of the laminated body 20.

The first external electrode 50a includes a first base electrode layer 52a provided on the surface of the laminated body 20 so as to cover the laminated body 20, and a first plating layer 60a provided on the surface of the first base electrode layer 52a so as to cover the first base electrode layer 52a. Likewise, the second external electrode 50b includes a second base electrode layer 52b provided on the surface of the laminated body 20 so as to cover the laminated body 20, and a second plating layer 60b provided on the surface of the second base electrode layer 52b so as to cover the second base electrode layer 52b.

The first base electrode layer 52a is provided on the first end surface 26a of the laminated body 20 so as to cover the first end surface 26a thereof, and extended therefrom and thus partially reaches each of the first principal surface 22a, the second principal surface 22b, the first side surface 24a, and the second side surface 24b. It is to be noted that the first base electrode layer 52a may be provided only on the first end surface 26a of the laminated body 20. On the other hand, the second base electrode layer 52b is provided on the second end surface 26b of the laminated body 20 so as to cover the second end surface 26b thereof, and extended therefrom and thus partially reaches each of the first principal surface 22a, the second principal surface 22b, the first side surface 24a, and the second side surface 24b. It is to be noted that the second base electrode layer 52b may be provided only on the second end surface 26b of the laminated body 20.

The first base electrode layer 52a and the second base electrode layer 52b each include at least one selected from a baked layer, a resin layer, a thin film layer, and the like. The baked layer includes glass and a metal. The glass contains at least one selected from Si, Zn, Pd, Li, Na, K, and the like. In addition, the metal contains at least one selected from, for example, Cu, Ni, Ag, Pd, an Ag—Pd alloy, Au, and the like. The baked layer is formed by applying a conductive paste including glass and a metal to the laminated body 20, and baking the paste. The baked layer may be formed by co-firing with the first internal electrode layers 40b and the second internal electrode layers 40b, or formed by baking after firing the first internal electrode layers 40a and the second internal electrode layers 40b, for example. Further, the baked layer may include multiple layers.

The first plating layer 60a is provided on the surface of the first base electrode layer 52a so as to cover the first base electrode layer 52a on the first end surface 26a of the laminated body 20, and extended therefrom and thus provided on the surface of the first base electrode layer 52a so as to cover even the first base electrode layer 52a on each of the first principal surface 22a, the second principal surface 22b, the first side surface 24a, and the second side surface 24b. It is to be noted that the first plating layer 60a may be provided on the surface of the first base electrode layer 52a so as to cover the first base electrode layer 52a provided only on the first end surface 26a of the laminated body 20. On the other hand, the second plating layer 60b is provided on the surface of the second base electrode layer 52b so as to cover the second base electrode layer 52b on the second end surface 26b of the laminated body 20, and extended therefrom and thus provided on the surface of the second base electrode layer 52b so as to cover even the second base electrode layer 52b on each of the first principal surface 22a, the second principal surface 22b, the first side surface 24a, and the second side surface 24b. It is to be noted that the second plating layer 60b may be provided on the surface of the second base electrode layer 52b so as to cover the second base electrode layer 52b provided only on the second end surface 26b of the laminated body 20.

The first plating layer 60a and the second plating layer 60b contain at least one selected from, for example, Cu, Sn, Ni, Ag, Pd, an Ag—Pd alloy, Au, and the like. The first plating layer 60a and the second plating layer 60b may include multiple layers. It is to be noted that the first plating layer 60a and the second plating layer 60b each preferably have a two-layer structure of an Ni plating layer and an Sn plating layer, for example. The Ni plating layer prevents the first base electrode layer 52a and the second base electrode layer 52b from being eroded by solder in the case of mounting the multilayer ceramic capacitor 10. In addition, the Sn plating layer improves solderability, thus making it easy to mount the multilayer ceramic capacitor 10.

Figure 4:
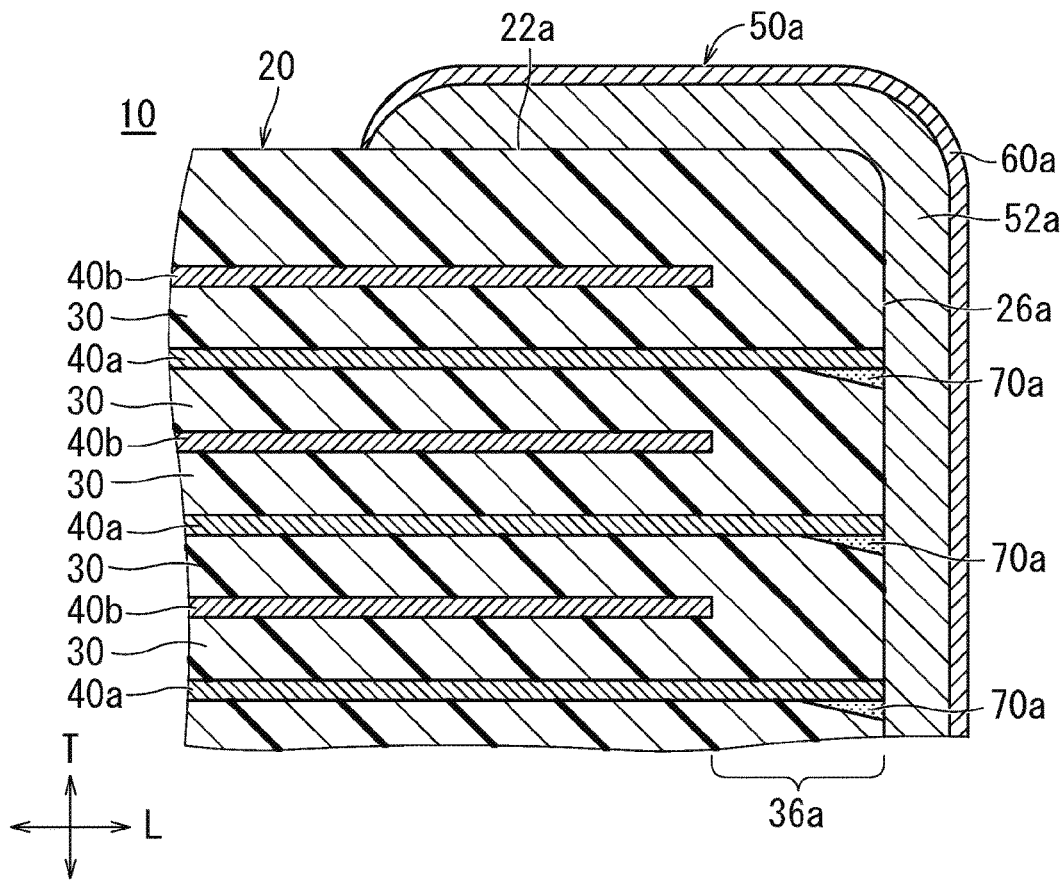
FIG. 4 is a cross-sectional view in the length direction, for illustrating a multilayer ceramic capacitor according to a preferred embodiment of the present invention, which is an enlarged view of first diffusion portions and the vicinity thereof.
Figure 5:
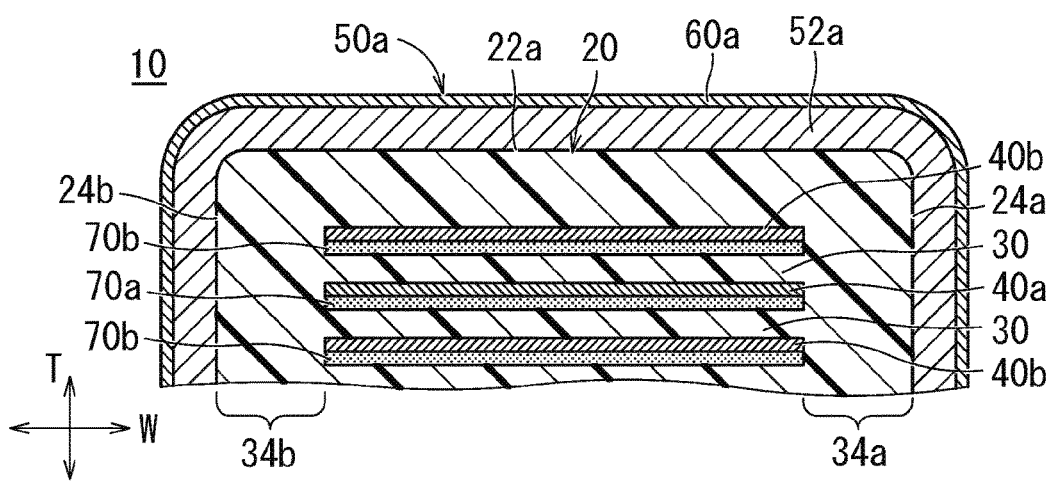
FIG. 5 is a cross-sectional view near a first end surface in the width direction, for illustrating a multilayer ceramic capacitor according to a preferred embodiment of the present invention, which is an enlarged view of a first diffusion portion and the vicinity thereof.

First diffusion portions 70a and second diffusion portions 70b will be described with reference to FIGS. 4 and 5. FIG. 4 is a cross-sectional view in the length direction, for illustrating a multilayer ceramic capacitor according to a preferred embodiment of the present invention, which is an enlarged view of first diffusion portions and the vicinity thereof. FIG. 5 is a cross-sectional view near a first end surface in the width direction, for illustrating a multilayer ceramic capacitor according to a preferred embodiment of the present invention, which is an enlarged view of a first diffusion portion and the vicinity thereof.

The first diffusion portions 70a are defined by interdiffusion of the plurality of first internal electrode layers 40a and the first external electrode 50a at the interfaces between the plurality of first internal electrode layers 40a and the plurality of ceramic layers 30. In addition, the first diffusion portions 70a extend in the length direction from the first end surface 26a of the laminated body 20. The first diffusion portion 70a preferably has a dimension of about 20 μm or more and about 30 μm or less in the length direction, for example. It is to be noted that the first diffusion portions 70a preferably never reach the opposed electrode portions of the first internal electrode layers 40a, for example. More specifically, the first diffusion portions 70a are preferably provided only at the first end portion 36a of the laminated body 20. More specifically, the first diffusion portions 70a are provided only at the portion extending from the first end surface 26a of the laminated body 20 to about ½ of the first end portion 36a in the length direction, for example. The first diffusion portions 70a are preferably structured such that the dimensions in the thickness direction are smaller from the first end surface 26a toward the second end surface 26b in a cross section in the length direction.

The first diffusion portions 70a are defined by interdiffusion of a conductive paste for internal electrodes and a conductive paste for the external electrodes into spaces formed in advance at sides of the first internal electrode layers 40a closer to the principal surface (closer to the bottom surface in FIGS. 4 and 5) in a sintering step. More specifically, the spaces are clearance spaces for interdiffusion of the first internal electrode layers 40a and the first external electrode 50a when a conductive paste for external electrodes is subjected to sintering. As mentioned above, the first diffusion portions 70a join the first external electrode 50a to each of the plurality of first internal electrode layers 40a.

The second diffusion portions 70b are defined by interdiffusion of a conductive paste for internal electrodes and a conductive paste for the external electrodes into spaces formed in advance at sides of the second internal electrode layers 40b closer to the principal surface in a sintering step. In addition, the second diffusion portions 70b extend in the length direction from the second end surface 26b of the laminated body 20. The second diffusion portion 70b preferably has a dimension of about 20 μm or more and about 30 μm or less in the length direction, for example. It is to be noted that the second diffusion portions 70b preferably never reach the opposed electrode portions of the second internal electrode layers 40b. More specifically, the second diffusion portions 70b are preferably provided only at the second end portion 36b of the laminated body 20. More specifically, the second diffusion portions 70b are provided only at the portion extending from the second end surface 26b of the laminated body 20 to about ½ of the second end portion 36b in the length direction, for example. The second diffusion portions 70b are preferably structured such that the dimensions in the thickness direction are smaller from the second end surface 26b toward the first end surface 26a in a cross section in the length direction.

The second diffusion portions 70b are defined by interdiffusion of the second internal electrode layers 40b and the second external electrode 50b in spaces formed in advance at sides of the second internal electrode layers 40b closer to the principal surface. More specifically, the spaces are clearance spaces for interdiffusion of the second internal electrode layers 40b and the second external electrode 50b when a conductive paste for external electrodes is subjected to sintering. As mentioned above, the second diffusion portions 70b join the second external electrode 50b to each of the plurality of second internal electrode layers 40b.

Preferably, the first diffusion portions 70a and the second diffusion portions 70b each contain Cu, and the first internal electrode layers 40a and the second internal electrode layers 40b each contain Ni. More preferably, Cu in the first diffusion portions 70a diffuses into Ni in the extended electrode portions of the first internal electrode layers 40a, and Cu in the second diffusion portions 70b diffuses into Ni in the extended electrode portions of the second internal electrode layers 40b.

The multilayer ceramic capacitor 10 according to this preferred embodiment includes the first diffusion portions 70a extending along the interfaces between the first internal electrode layers 40a and the ceramic layers 30. The first diffusion portions 70a are defined by interdiffusion of a conductive paste for internal electrodes and a conductive paste for the external electrodes into spaces formed in advance at sides of the first internal electrode layers 40a closer to the principal surface in a sintering step. Thus, the laminated body 20 has no deflection stress generated even when the conductive paste for external electrodes diffuses toward the first internal electrode layers 40a in the step of making the conductive paste sintered. As a result, the multilayer ceramic capacitor 10 significantly reduces or prevents the generation of cracks which can be produced when a conductive paste for external electrodes is subjected to sintering. In addition, the multilayer ceramic capacitor 10 also achieves the effect of causing the first diffusion portions 70a to join strongly the first external electrode 50a and the plurality of first internal electrode layers 40a. It is to be noted that the second diffusion portions 70b achieve a similar effect to the first diffusion portions 70a, and descriptions thereof will not be thus repeated.

In addition, in the multilayer ceramic capacitor 10 according to this preferred embodiment, the first diffusion portions 70a and the second diffusion portions 70b each contain Cu, and the first internal electrode layers 40a and the second internal electrode layers 40b each contain Ni. Thus, the first diffusion portions 70a and the first internal electrode layers 40a are connected strongly, and the second diffusion portions 70b and the second internal electrode layers 40b are joined strongly. As a result, the multilayer ceramic capacitor 10 also achieves the effect of strongly connecting the first external electrode 50a and the plurality of first internal electrode layers 40a and strongly joining the second external electrode 50b and the plurality of second internal electrode layers 40b.

Furthermore, in the multilayer ceramic capacitor 10 according to this preferred embodiment, the Cu in the first diffusion portions 70a diffuses into the Ni in the extended electrode portions of the first internal electrode layers 40a, and the Cu in the second diffusion portions 70b diffuses into the Ni in the extended electrode portions of the second internal electrode layers 40b. Thus, the first diffusion portions 70a and the first internal electrode layers 40a are joined strongly, and the second diffusion portions 70b and the second internal electrode layers 40b are joined strongly. As a result, the multilayer ceramic capacitor 10 also achieves the effect of strongly joining the first external electrode 50a and the plurality of first internal electrode layers 40a and strongly joining the second external electrode 50b and the plurality of second internal electrode layers 40b.

Furthermore, in the multilayer ceramic capacitor 10 according to this preferred embodiment, the first diffusion portions 70a and the second diffusion portions 70b each have a dimension of about 20 μm or more and about 30 μm or less in the length direction, for example. Thus, the multilayer ceramic capacitor 10 significantly reduces or prevents excessive diffusion of the first external electrode 50a and the plurality of first internal electrode layers 40a and significantly reduces or prevents excessive diffusion of the second external electrode 50b and the plurality of second internal electrode layers 40b, while significantly reducing or preventing a decrease in connectivity between the first external electrode 50a and the plurality of first internal electrode layers 40a and a decrease in connectivity between the second external electrode 50b and the plurality of second internal electrode layers 40b. Therefore, the first external electrode 50a and the plurality of first internal electrode layers 40a are joined effectively, and the second external electrode 50b and the plurality of second internal electrode layers 40b are joined effectively. As a result, the multilayer ceramic capacitor 10 significantly reduces or prevents the generation of cracks.

An example of a method for manufacturing a multilayer ceramic capacitor according to a preferred embodiment of the present invention will be described by taking, as an example, a multilayer ceramic capacitor 10 according to a preferred embodiment as described above.

First, ceramic sheets and a conductive paste for internal electrodes are prepared. The ceramic sheets and the conductive paste for internal electrodes include a binder and a solvent. Known organic binders can be used as the binder. In addition, organic solvents can be used as the solvent.

Next, onto the surfaces of the ceramic sheets, the conductive paste for the internal electrodes is applied in predetermined patterns by, for example, screen printing or gravure printing, thus forming internal electrode patterns. In addition, ceramic sheets for outer layers are also prepared without any internal electrode pattern applied by printing.

Furthermore, the ceramic sheets for outer layers are stacked to reach a predetermined number of sheets, the ceramic sheets with the internal electrode patterns applied by printing are sequentially stacked on the surface, and the ceramic sheets for outer layers are stacked on the surface to reach a predetermined number of sheets. In this way, a stacked sheet is prepared.

Then, a resin or the like that can burn down in a firing step to be described later is applied to sites of internal electrodes extended from end surfaces of the stacked sheet. This step is carried out for forming spaces that allow for interdiffusion of the conductive paste for internal electrodes and a conductive paste for external electrodes. It is to be noted that the spaces may be formed by other methods.

Next, the stacked sheet is subjected to pressing in the stacking direction by means such as isostatic press, thus preparing a laminated block.

Furthermore, the laminated block is cut into a predetermined size, thus cutting out a laminated chip. In this regard, the laminated chip may have corners and ridges rounded by barrel polishing or the like.

Then, the laminated chip is subjected to firing, thus preparing a laminated body. The firing temperature in this case is preferably about 900° C. or higher and about 1300° C. or lower, for example, depending on the materials of the dielectric and internal electrodes.

Next, the conductive paste for external electrodes is applied to both end surfaces of the laminated body, and subjected to baking, thus forming baked layers for external electrodes. The baking temperature in this case is preferably about 700° C. or higher and about 900° C. or lower, for example.

Finally, plated layers are formed on the surfaces of the external electrodes by applying a plating treatment.

In the way mentioned above, a multilayer ceramic capacitor 10 according to a preferred embodiment of the present invention can be manufactured.

EXPERIMENTAL EXAMPLE

Finally, an experimental example will be described which was provided by the inventors to confirm the advantageous effects of preferred embodiments of the present invention.

In the experimental example, samples (multilayer ceramic capacitors 10) according to an example were prepared by the manufacturing method mentioned above. In addition, samples according to a comparative example were prepared by a conventional manufacturing method. In this regard, the conventional manufacturing method refers to a manufacturing method that excludes only the step of applying a resin or the like that can burn down in the firing step, to the sites of internal electrodes extended from the end surfaces of the stacked sheet in the manufacturing method mentioned above.

Ten samples were prepared for each of the example and the comparative example. Here are specifications common to the respective samples. It is to be noted that the following approximate numerical values correspond to those after the firing.

Size (L Dimension×W Dimension×T Dimension): 0.6 mm×0.3 mm×0.3 mm
Thickness of Ceramic Layer: 1.10 μm
Thickness of Internal Electrode: 0.76 μm
Thickness of Outer Layer: 37 μm
Number of Layers Laminated: 155 layers After baking external electrodes, the number of cracks generated was checked by inspecting a cross section (WT cross section) in the width direction. Specifically, polishing was carried out until reaching the location of about ½ the length in the width direction W, so as to be parallel or substantially parallel to the first side surface or second side surface of the multilayer ceramic capacitor, and in the cross section, whether any crack was generated or not was checked with the use of a microscope. None of the ten samples according to the example was cracked. On the other hand, four out of the ten samples according to the comparative example were cracked. From this experimental result, advantageous effects of the multilayer ceramic capacitors according to preferred embodiments of the present invention have been successfully confirmed.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A multilayer ceramic capacitor comprising:
a laminated body including a plurality of ceramic layers, a plurality of first internal electrode layers, and a plurality of second internal electrode layers alternately laminated, the laminated body including a first principal surface and a second principal surface opposite to each other in a laminating direction, a first side surface and a second side surface opposite to each other in a width direction perpendicular or substantially perpendicular to the laminating direction, and a first end surface and a second end surface opposite to each other in a length direction perpendicular or substantially perpendicular to the laminating direction and the width direction;
a first external electrode provided on the first end surface of the laminated body; and
a second external electrode provided on the second end surface of the laminated body; wherein
each of the plurality of first internal electrode layers is electrically connected to the first external electrode by an extended electrode portion that extends to the first end surface of the laminated body;
each of the plurality of second internal electrode layers is electrically connected to the second external electrode by an extended electrode portion that extends to the second end surface of the laminated body;
first diffusion portions are defined by interdiffusion of the plurality of first internal electrode layers and the first external electrode at interfaces between the plurality of first internal electrode layers and the plurality of ceramic layers;

second diffusion portions are defined by interdiffusion of the plurality of second internal electrode layers and the second external electrode at interfaces between the plurality of second internal electrode layers and the plurality of ceramic layers;

the first external electrode includes a first base electrode layer and the second external electrode layer includes a second base electrode layer;

each of the first base electrode layer and the second base electrode layer includes glass and a metal;

the first diffusion portions are provided on lower surfaces of the plurality of first internal electrode layers, and the second diffusion portions are provided on lower surfaces of the plurality of second internal electrode layers;

the first diffusion portions and the second diffusion portions each have a substantially triangular shape in a cross-sectional view in the length direction; and the first diffusion portions and the second diffusion portions each have a dimension of about 20 µm or more and about 30 µm or less in the length direction.

2. The multilayer ceramic capacitor according to claim 1, wherein the first diffusion portions and the second diffusion portions each contain Cu, and the first internal electrode layers and the second internal electrode layers each contain Ni.

3. The multilayer ceramic capacitor according to claim 2, wherein the Cu in the first diffusion portions is diffused into the Ni in the extended electrode portions of the first internal electrode layers, and the Cu in the second diffusion portions is diffused into the Ni in the extended electrode portions of the second internal electrode layers.

4. The multilayer ceramic capacitor according to claim 1, wherein the laminated body has a rectangular or substantially rectangular parallelepiped shape.

5. The multilayer ceramic capacitor according to claim 1, wherein the laminated body includes corners or ridges that are rounded.

6. The multilayer ceramic capacitor according to claim 1, wherein each of the first base electrode layer and the second base electrode layer is provided on the laminated body; and the first external electrode includes a first plating layer on the first base electrode layer and the second external electrode includes a second plating layer on the second base electrode layer.

7. The multilayer ceramic capacitor according to claim 6, wherein each of the first base electrode layer and the second base electrode layer is one of a baked layer, a resin layer, and a thin film layer.

8. The multilayer ceramic capacitor according to claim 6, wherein each of the first plating layer and the second plating layer includes at least one of Cu, Sn, Ni, Ag, Pd, Au, and an Ag-Pd alloy.

9. The multilayer ceramic capacitor according to claim 6, wherein each of the first plating layer and the second plating layer includes a plurality of layers.

10. The multilayer ceramic capacitor according to claim 1, wherein the first diffusion portions are located only at the first end surface of the laminated body.

11. The multilayer ceramic capacitor according to claim 1, wherein the first diffusion portions do not extend to opposed electrode portions of the first internal electrode layers.

12. The multilayer ceramic capacitor according to claim 1, wherein the first diffusion portions are located only at an area extending from the first end surface to about ½ of a length between the first end surface and the plurality of second internal electrode layers.

13. The multilayer ceramic capacitor according to claim 1, wherein dimensions of the first diffusion portions in the thickness direction are smaller from the first end surface toward the second end surface in a cross section in the length direction.

14. The multilayer ceramic capacitor according to claim 1, wherein the first diffusion portions join the first external electrode to each of the plurality of first internal electrode layers.

15. The multilayer ceramic capacitor according to claim 1, wherein the second diffusion portions are located only at the second end surface of the laminated body.

16. The multilayer ceramic capacitor according to claim 1, wherein the second diffusion portions do not extend to opposed electrode portions of the second internal electrode layers.

17. The multilayer ceramic capacitor according to claim 1, wherein the second diffusion portions are located only at an area extending from the second end surface to about ½ of a length between the second end surface and the plurality of first internal electrode layers.

18. The multilayer ceramic capacitor according to claim 1, wherein dimensions of the second diffusion portions in the thickness direction are smaller from the second end surface toward the first end surface in a cross section in the length direction.

19. The multilayer ceramic capacitor according to claim 1, wherein the second diffusion portions join the second external electrode to each of the plurality of second internal electrode layers.

* * * * *